(12) United States Patent
Lederer et al.

(10) Patent No.: US 11,383,474 B2
(45) Date of Patent: Jul. 12, 2022

(54) PROCESS FOR FORMING A WINDOW IN A CARTON

(71) Applicant: Carton Service CSI, LLC, Shelby, OH (US)

(72) Inventors: Reid Lederer, Shelby, OH (US); Dave Higgins, Shelby, OH (US); Terrance Wenninger, Shelby, OH (US); Scott Garverick, Shelby, OH (US); Mike Robinette, Shelby, OH (US); Warren Turner, Shelby, OH (US)

(73) Assignee: Carton Service CSI, LLC, Shelby, OH (US)

( * ) Notice: Subject to any disclaimer, the term of this patent is extended or adjusted under 35 U.S.C. 154(b) by 11 days.

(21) Appl. No.: 16/907,453

(22) Filed: Jun. 22, 2020

(65) Prior Publication Data

US 2020/0316897 A1    Oct. 8, 2020

Related U.S. Application Data (63) Continuation-in-part of application No. 15/956,319, filed on Apr. 18, 2018, now abandoned.

(60) Provisional application No. 62/638,354, filed on Mar. 5, 2018.

(51) Int. Cl.

| | |
|---|---|
| *B31B 50/83* | (2017.01) |
| *B31B 50/82* | (2017.01) |
| *B31B 50/26* | (2017.01) |
| *B65D 5/06* | (2006.01) |
| *B65D 5/42* | (2006.01) |
| *B29C 65/48* | (2006.01) |
| *B31B 120/30* | (2017.01) |

(52) U.S. Cl.
CPC .......... *B31B 50/82* (2017.08); *B29C 65/4825* (2013.01); *B31B 50/26* (2017.08); *B31B 50/83* (2017.08); *B65D 5/067* (2013.01); *B65D 5/4204* (2013.01); *B31B 2120/302* (2017.08)

(58) Field of Classification Search
CPC .............................. B31B 50/82; B65D 5/4204
See application file for complete search history.

(56) References Cited

U.S. PATENT DOCUMENTS

| | | | |
|---|---|---|---|
| 2009/0297741 A1* | 12/2009 | Oshita | ..................... B32B 27/36 |
| | | | 428/34.2 |
| 2011/0245056 A1* | 10/2011 | Machamer | .............. B31B 50/00 |
| | | | 493/84 |
| 2017/0043900 A1* | 2/2017 | Weissman | .......... B65D 5/48014 |
| 2018/0370676 A1* | 12/2018 | Thompson | ......... B65D 77/0426 |

* cited by examiner

*Primary Examiner* — Philip C Tucker
*Assistant Examiner* — John Blades
(74) *Attorney, Agent, or Firm* — Brennan, Manna & Diamond, LLC (57) ABSTRACT

A container with a non-heat-seal window and a process for fabricating a low surface energy container with a non-heat-seal window. The process comprises forming a container template and cutting an opening in the container template. A window comprising a window stock material, a releasable liner, and a wiped on adhesive positioned between the window stock material and the releasable liner is sized to overlap the opening. A portion of the adhesive is exposed and the window is positioned over the opening. The window is then secured to the container template over the opening without the need to apply heat, and the container template is folded into the low surface energy container with the window.

10 Claims, 7 Drawing Sheets

PROCESS FOR FORMING A WINDOW IN A CARTON

CROSS-REFERENCE

This application claims priority from Provisional Patent Application Ser. No. 62/638,354 filed Mar. 5, 2018, and is a Continuation-In-Part of U.S. Nonprovisional patent application Ser. No. 15/956,319 filed Apr. 18, 2018

FIELD OF THE INVENTION

This invention pertains generally to a container with a window for viewing interior contents, and more particularly to a process for forming a see-through window in a low surface energy container stock without using a heat sealing process.

BACKGROUND

There are a wide variety of containers used to store products. Many of these containers are manufactured from opaque or non-see-through materials such as a paperboard, opaque plastic stock, etc. A typical example of such an opaque container is a milk carton manufactured from a container stock material with a low surface energy. These materials do not allow a potential buyer to visualize the product housed in the container.

One option to overcome this disadvantage is to use a completely or substantially transparent stock material for the entire carton or container. However, transparent stock materials are not generally foldable into a carton shape, and must typically be pre-formed or molded into the final shape. Additionally, any product information, ingredient list, or marketing material must be later applied in the form of labels or by a writing implement creating another step in the manufacturing process.

Another option to permit a potential buyer to visualize the product housed in the opaque container without opening the same is to cut a hole in the opaque stock container and apply a window material over the opening using a heat or flame sealing process. Unfortunately, this particular approach both complicates and prolongs the manufacturing process, and requires the container manufacturer to purchase heat sealing tools to create a windowed container, which can be expensive.

Consequently, there is a long felt need in the art for a process to create a carton or container with a way to see inside the container without employing a heat sealing technique or specialized equipment. The process of the present invention allows a container or carton manufacturer to effectively generate a low surface energy paperboard stock based container with a transparent display window without the need for using a heat or flame sealing process. The container manufacturer can now generate a windowed container with or without an in-line process and without the need to use heat or flame sealing tools. The windowed container allows a user to view an interior of the container and its contents without opening the container if it is sealed, or without needing to re-open a previously opened container.

SUMMARY

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a process for fabricating a container with a window without employing a heat sealing technique. The process starts by selecting a low surface energy container stock material comprising an inside surface and an outside surface. The container stock material is formed into a container template. An opening is then cut in a desired location within the container template. A window is then positioned and adhered to the inside surface of the container template so that the window completely overlaps the opening. Finally, the container template is folded into the container with the window transparently sealing the opening.

In an alternative embodiment of the present invention the window comprises a window stock material, a releasable liner, and an adhesive sandwiched between the window stock material and the releasable liner. The window stock material comprises an opening overlap portion for engaging the inside surface of the container template surrounding the opening. A portion of the adhesive that substantially conforms to the dimensions of the opening overlap portion of the window that engages the inside surface of the container stock material surrounding the opening is exposed. The exposed portion of the adhesive is then bonded to an overlap perimeter around the opening of the inside surface of the container stock using pressure so that the window completely covers and transparently seals the opening from the inside of the container.

Furthermore, in an additional embodiment of the present invention the subject matter discloses a container with a window. The container comprises a low surface energy container template and an opening in the template. The window comprises a window stock material, a releasable liner, and an adhesive sandwiched or positioned between the window stock material and the releasable liner. The window is bonded to the low surface energy container template without using a heat source.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter. The invention relates generally to a process for manufacturing a low surface energy substrate container with a non-heat-sealed window.

A pressure sensitive adhesive process has distinct advantages over a laminating process or one requiring heat or flame sealing techniques for engaging a low surface energy substrate. The present invention discloses a technique for attaching a window element to a container stock such as a low surface energy polyethylene lined substrate commonly used to make cartons for dairy products, such as a milk carton. The process is just as advantageous for use in other container stock applications as well. This procedure is superior to other attaching methods and requires no mechanical fasteners or heat sealing equipment or tools, which can be both expensive and extend the manufacturing process. This process prevents glue or similar adhesives from tracking or migrating along lower energy surfaces that would not readily absorb the same. Similarly, the process of the present invention eliminates other curing or seeping problems.

This process generates a sleek finished look as the adhesive only engages an area of the window that overlaps the container stock material leaving a completely clear window with no overlap or distortion from transferred heat or adhesive. The adhesive is only exposed on the overlap portion of the window, so the portion of the window covering the opening in the container stock material itself is not sticky or distorted. The adhesive creates a strong bond with an evenly distributed tension across the entire adhesive exposed portion of the window. The stock material may then be readily stacked without adhesive seeping out causing adjacent stock material to inadvertently stick together.

Figure 1:
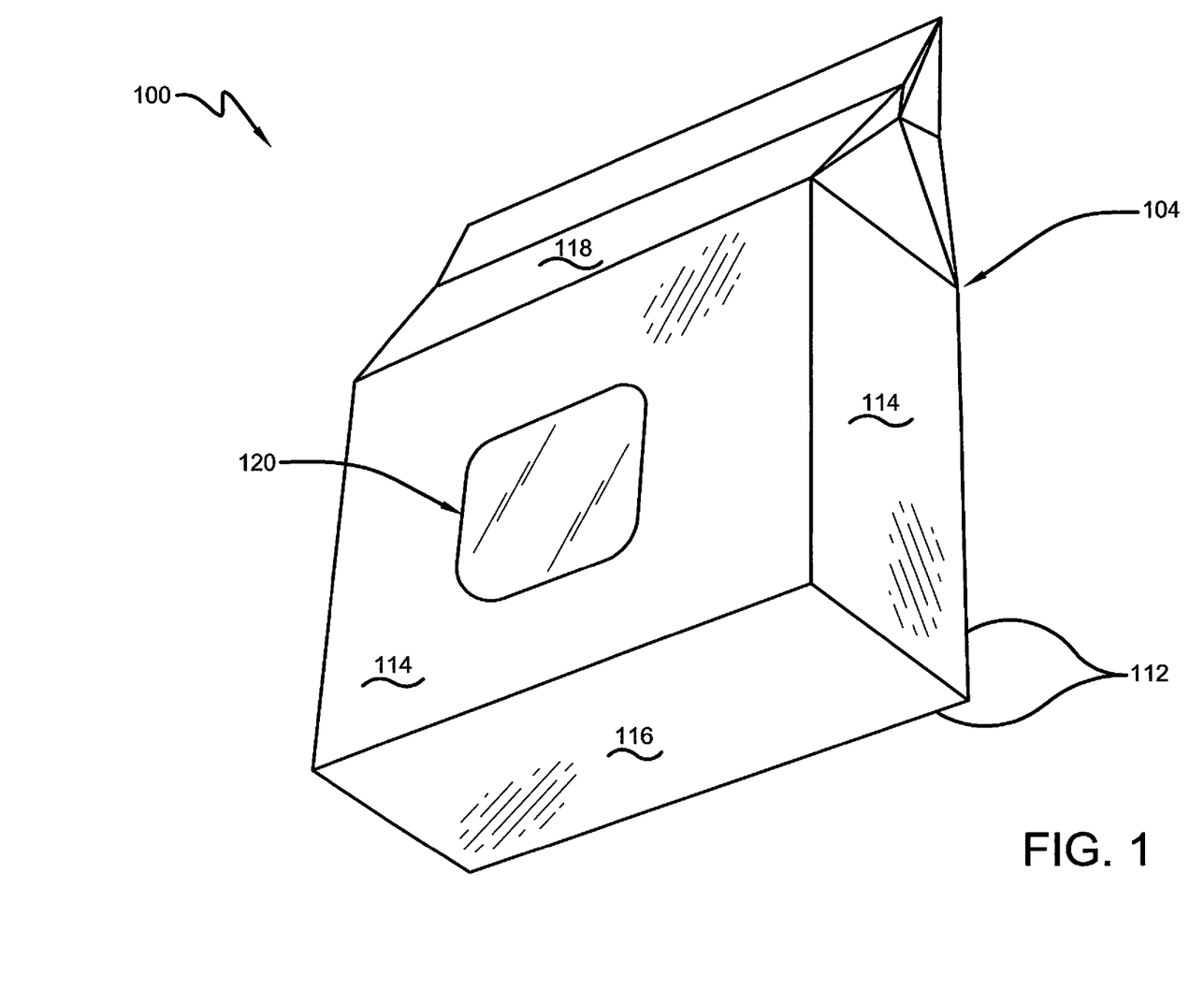
FIG. 1 illustrates a perspective view of a container with a non-heat-seal window in accordance with the disclosed architecture.
Figure 2:
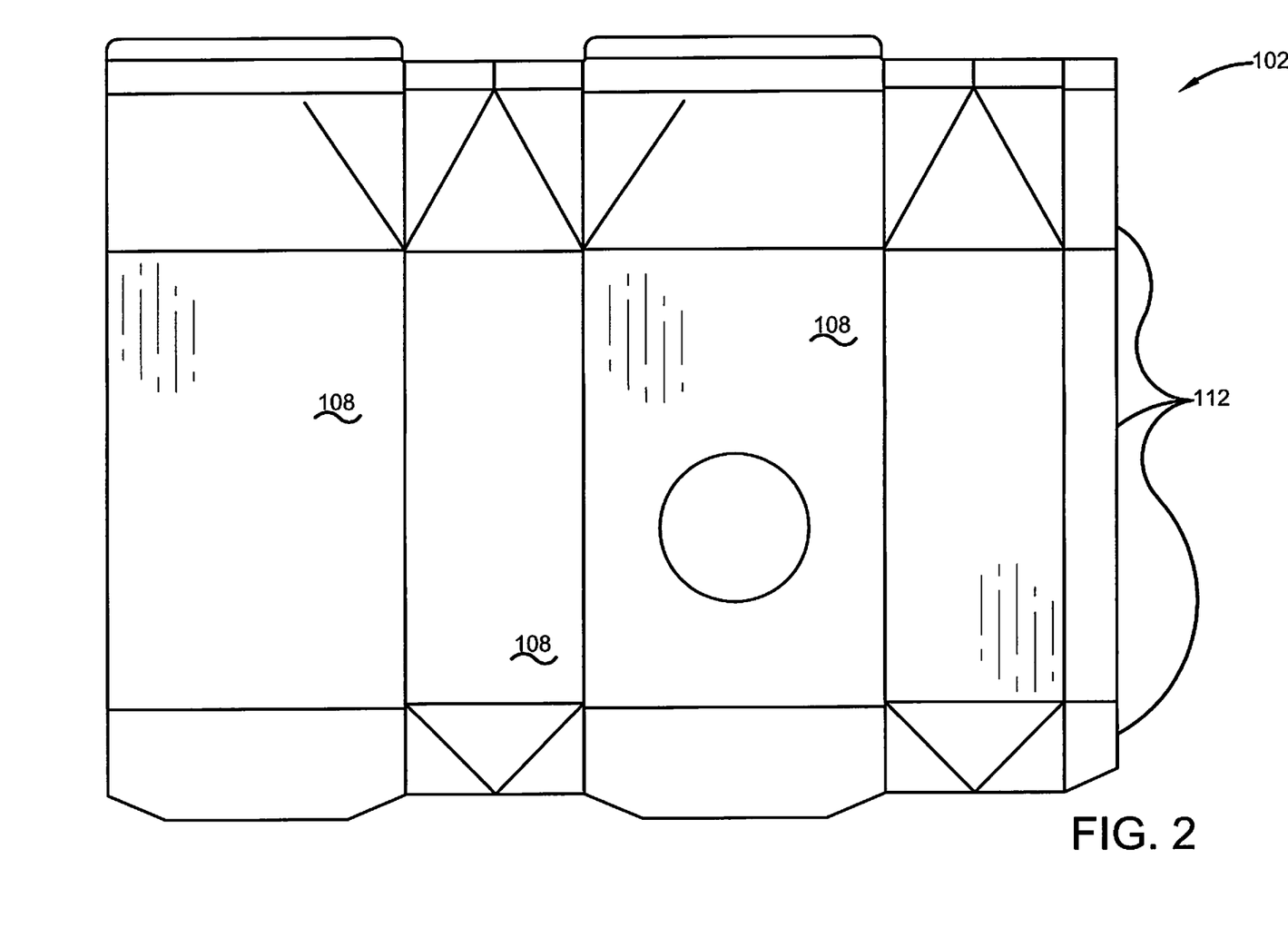
FIG. 2 illustrates a plan view of a container template for forming the container with the window in accordance with the disclosed architecture.

As illustrated in FIG. 1, a container 100 with a window 124 is disclosed. A container fabrication process allows a user to visualize an interior of the container 100 and its contents without the need to open or re-open the container 100. As illustrated in FIG. 2, a low surface energy container stock material 102, such as a material having a surface energy of no greater than forty dynes, may be used to fabricate a container template 104. The container template 104 comprises an inside surface 106 and an outside surface 108. Alternatively, only the inside surface 106 of the container stock material 102 may have a low surface energy. The container stock material 102 is typically manufactured from a low density polyethylene substrate, laminated polyethylene, nylon barrier substrates, foil-laminated polyethylene substrates, food grade materials, wax-coated paperboard, other odor barrier substrates, or the like. In one example, the container stock material 102 is a low density polyethylene (LDPE) paperboard. The primary purpose of the LDPE paperboard is to be sealed tight once the product is filled in the packaging. The inside surface 106 may comprise marking indicators such as a plurality of lines on the container stock that indicate portions of remaining volume, such as ½, and ¾ full level lines. The container template 104 may be used to create a gable top carton, an inner or outer fin top designed to customer specifications with a standard gable top bottom, S-bottom or L-bottom containers, or the like. The container 100 is then formed by folding the container stock material 102 along the container template 104.

Figure 3:
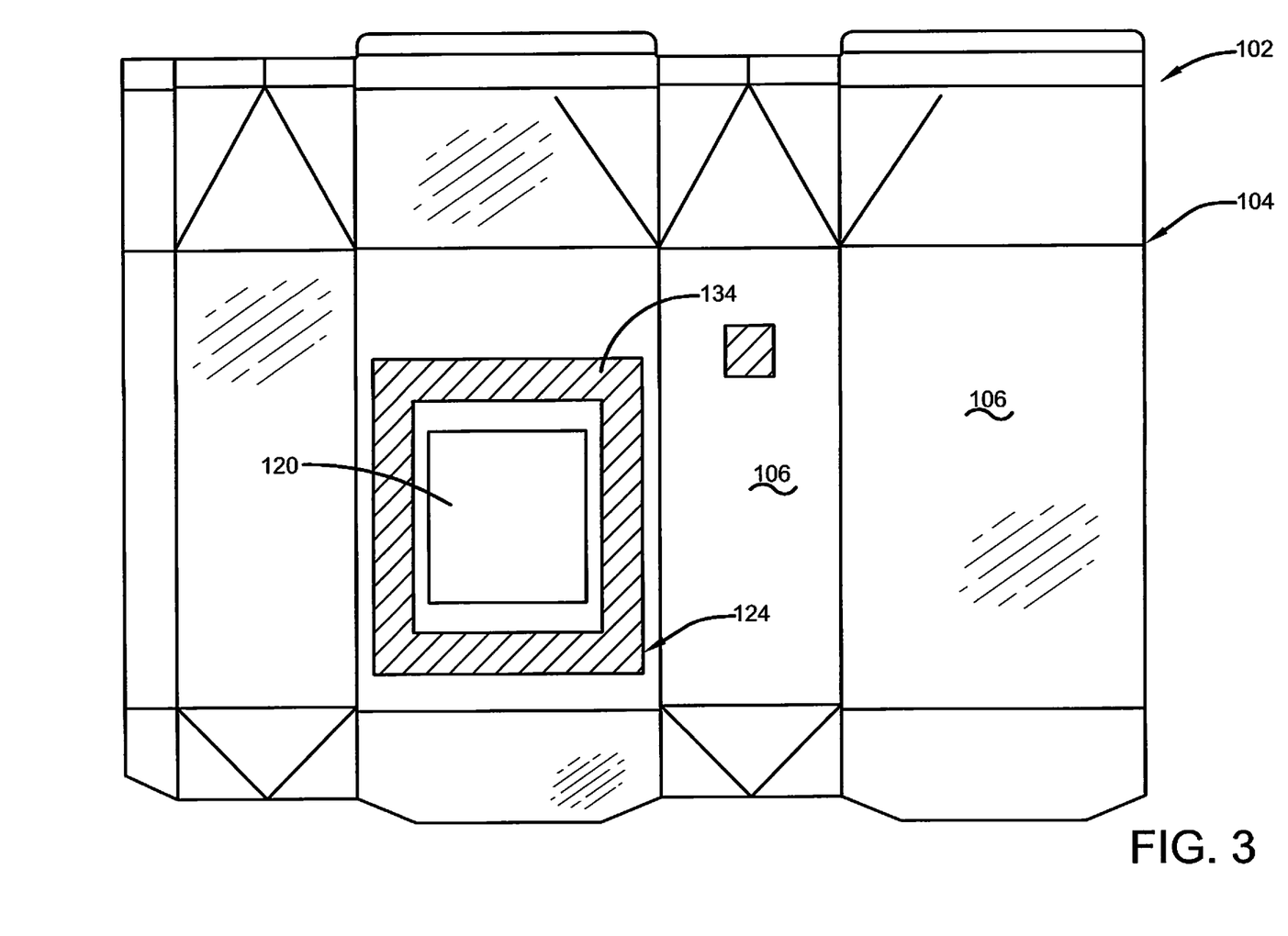
FIG. 3 illustrates a plan view of an inside surface of the container template of the container stock material with the window in accordance with the disclosed architecture.

As illustrated in FIG. 3, the container template 104 further comprises a plurality of panels 112 comprising a plurality of walls 114, a plurality of base panels 116, and a plurality of top panels 118. The plurality of top panels 118 may be configured to form a flat top, a gabled top, or any type of container top that suits user preference. The container template 104 further comprises an opening 120 cut into the container template 104. The opening 120 is typically located within at least one of the plurality of panels 112, such as within one or more of the plurality of walls 114. This allows a user to view inside the container 100 without having to open or reopen the same. However, this is not meant as a limitation, as the opening 120 may be located within any one of the plurality of panels 112, or in more than one of the plurality of panels 112 as desired.

Figure 4:
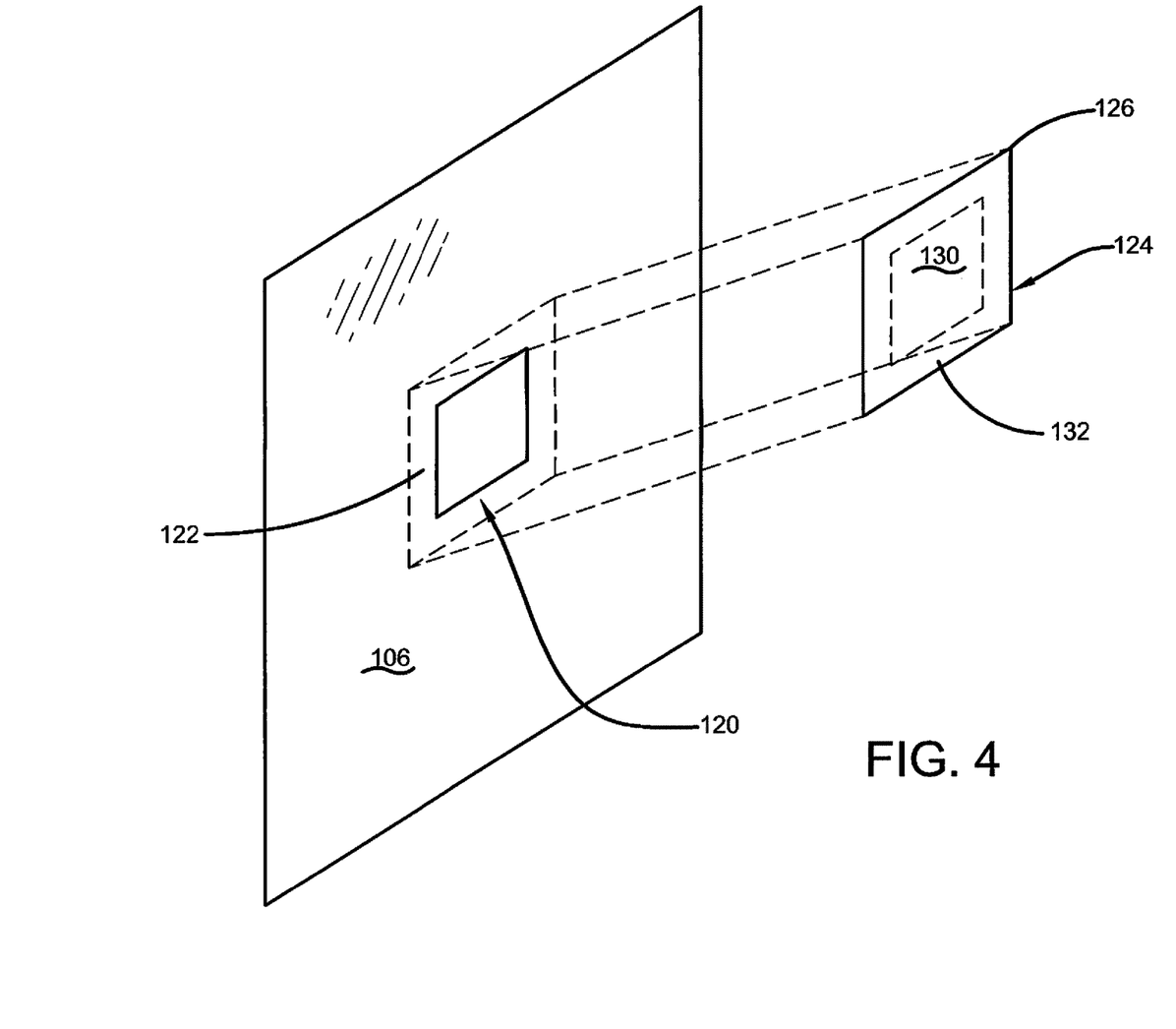
FIG. 4 illustrates an exploded view of the container template and the window in accordance with the disclosed architecture.
Figure 5:
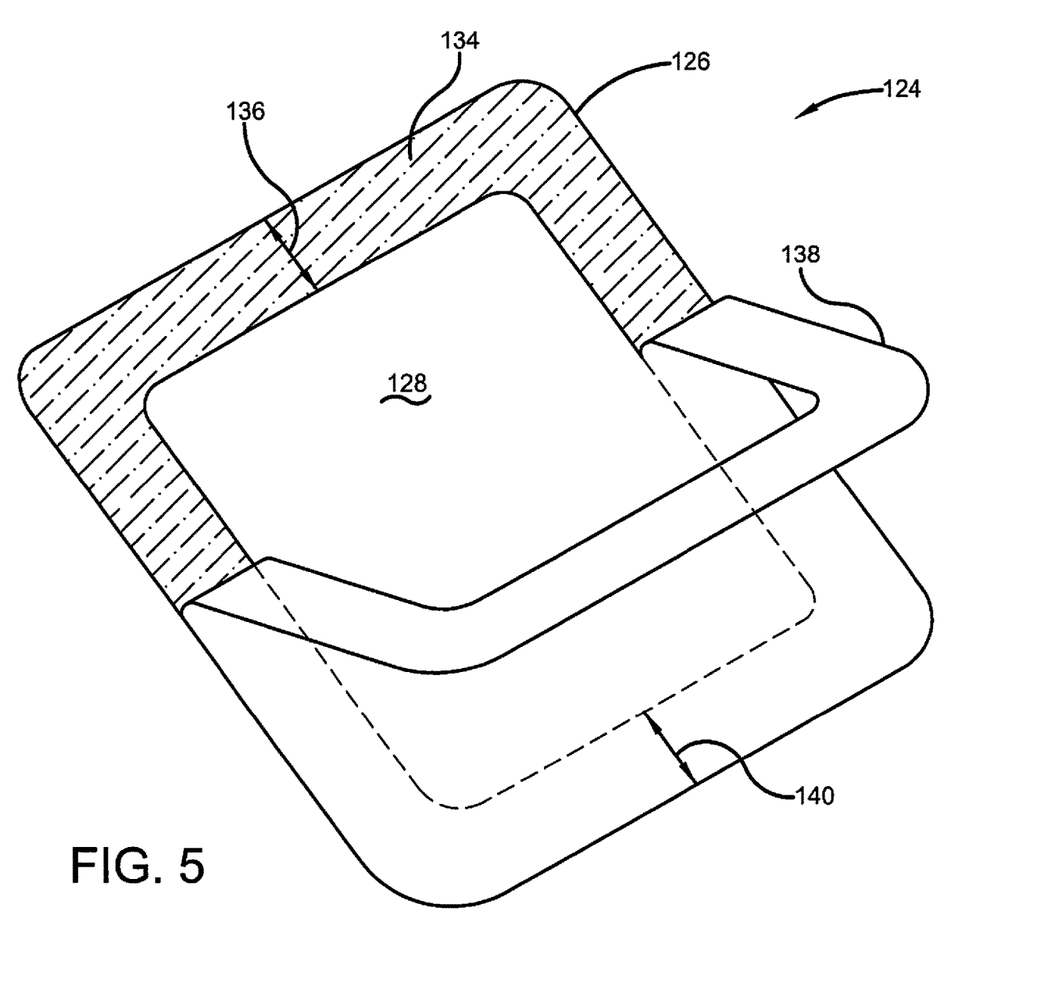
FIG. 5 illustrates a perspective view of the window in accordance with the disclosed architecture.
Figure 6:
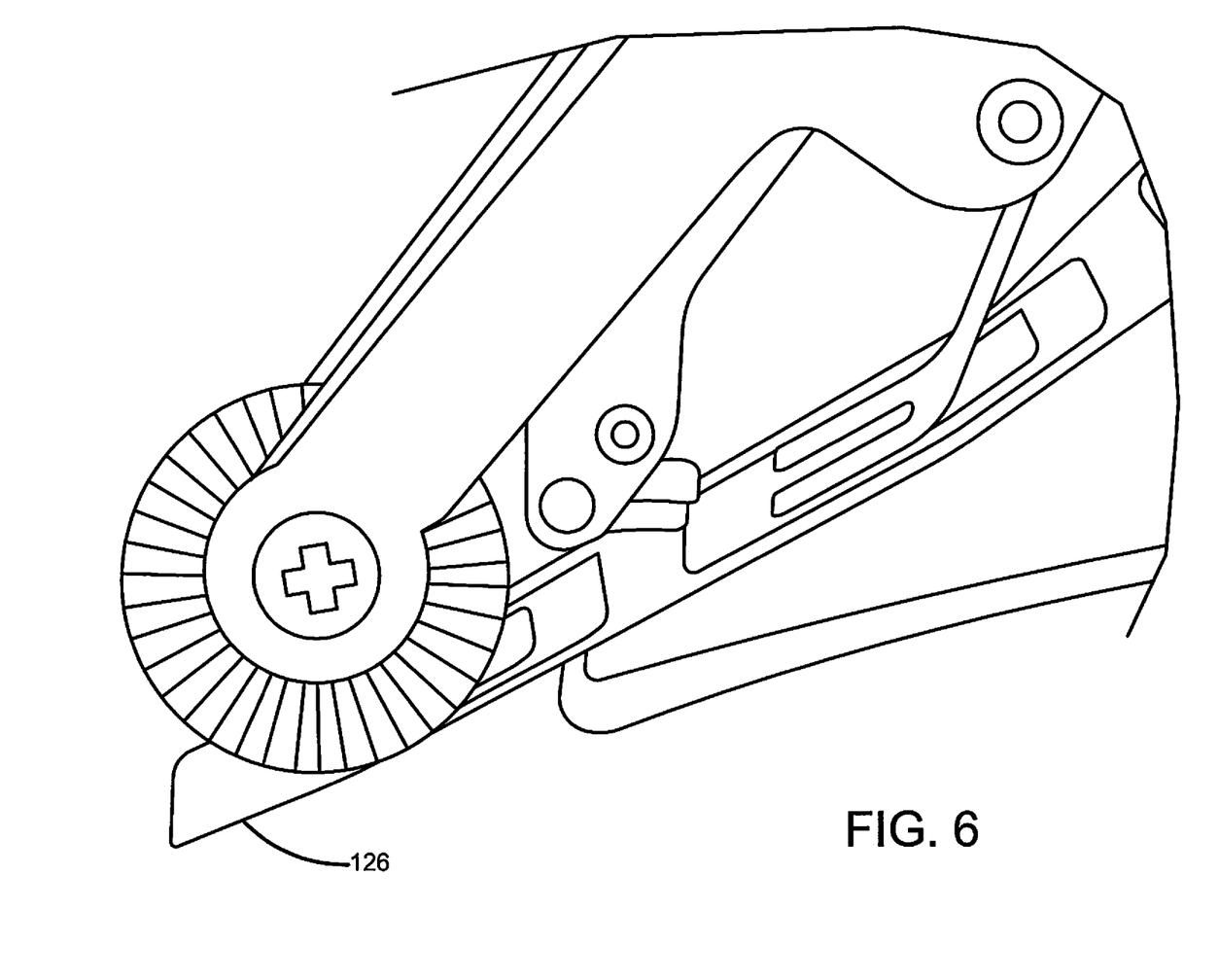
FIG. 6 illustrates a perspective view of the window being sized in accordance with the disclosed architecture.

As illustrated in FIGS. 4-6, the window 124 comprises a window stock material 126, a releasable liner 138, and an adhesive 134. The window stock material 126 comprises an exterior surface 128, an interior surface 130, and an opening overlap portion 132. The window stock material 126 is typically a transparent or translucent material such as, but not limited to, polyethylene terephthalate (PET), a thermoplastic polymer, polyester, or the like. The window 124 is dimensioned and sized so as to be slightly larger than and to overlap the opening 120 in the container 100, such as approximately at least ¹¹⁄₁₆ inches side to side larger and approximately at least ⅞ inches in the direction of travel larger which defines the opening overlap portion 132. The opening overlap portion 132 is the portion of the window that is larger than the opening 120 and that will engage and adhere to the inside surface 106 of the container template 104 as described infra.

The adhesive 134 is typically a two sided pressure adhesive, preferably a food grade pressure sensitive adhesive (PSA) or similar adhesive. The adhesive 134 bonds to both the window stock material 126 and the low surface energy container stock material 102 without the need to apply heat. The adhesive 134 is positioned or sandwiched between the exterior surface 128 of the window stock material 126 and the releasable liner 138. The releasable liner 138 may be cut, such as with a die cutter, to the size of the opening 120. When a portion of the releasable liner 138 is cut or scored, a cut portion 140 is peeled off exposing adhesive 134. An exposed adhesive portion 136 of the adhesive 134 will only engage an overlap perimeter 122 of the container template 104 surrounding the opening 120. As such, the adhesive 134 is only exposed on the window 124 where the window 124 overlaps the opening 120.

Next, the window 124 is positioned over the opening 120. Once the window 124 is in place over the opening 120, pressure is applied to the opening overlap portion 132 of the window stock material 126 and the overlap perimeter 122 of the container template 104. As such, the exterior surface 128 of the opening overlap portion 132 engages the inside surface 106 of the container template 104 thereby securing or bonding the window 124 to the container template 104. This is advantageous as the contents of the container 100 would press against, or apply pressure to, the now sealed opening overlap portion 132 of the window 124, thereby preventing a potential blowout of the window 124. The addition of the window 124 to LDPE paperboard packaging without the use of heat sealing or ultrasonic welding equipment is a new and unique process. Attempting to create a windowed container using low surface energy stock material without heat sealing using known materials and techniques presents several problems. The conventional application of a cellophane clear window film with cold glue on a low dyne surface, such as polyethylene or LDPE paperboard, simply traps the glue between two non-porous materials. This is problematic as the cold glue cannot "wet-out" quickly. For optimal adhesion, an adhesive must "wet out" the surface to be bonded. "Wetting out" means that the adhesive flows and covers a surface to maximize the contact area and the attractive forces between the adhesive and the bonding surface.

A lower surface energy material, such as polyethylene or LDPE paperboard, will cause pressure sensitive adhesives to bead up, reducing contact area with the surface. As such, there is an inability to balance control between applying enough glue to bond the film and the glue squeezing out at the edge of the film. Experimenting with different adhesives and materials does not solve the problem as the surface energy of the adhesive must be as low or lower than the surface energy of the substrate to be bonded to avoid these problems which is a reason why heat sealing is typically required.

The present invention uniquely overcomes the "wetting out" problem created by the low surface energy interior coating without heat sealing to achieve a controllable bond without glue squeezing out the edges of the overlap portion 132 of the window 124. The pressure sensitive adhesive 134 in the present invention is pre-applied to the window 124 in a non-conventional window application. A wipe on label applicator is used to wipe the adhesive onto the window 124, thereby decreasing a contact angle between the adhesive 134 and the window 124 and increasing the adhesion forces. The wipe on pre-applied adhesive 134 eliminates the "wetting out" problem which in turn eliminates the problem of the adhesive 134 squeezing out at the edges of the window 124.

Figure 7:
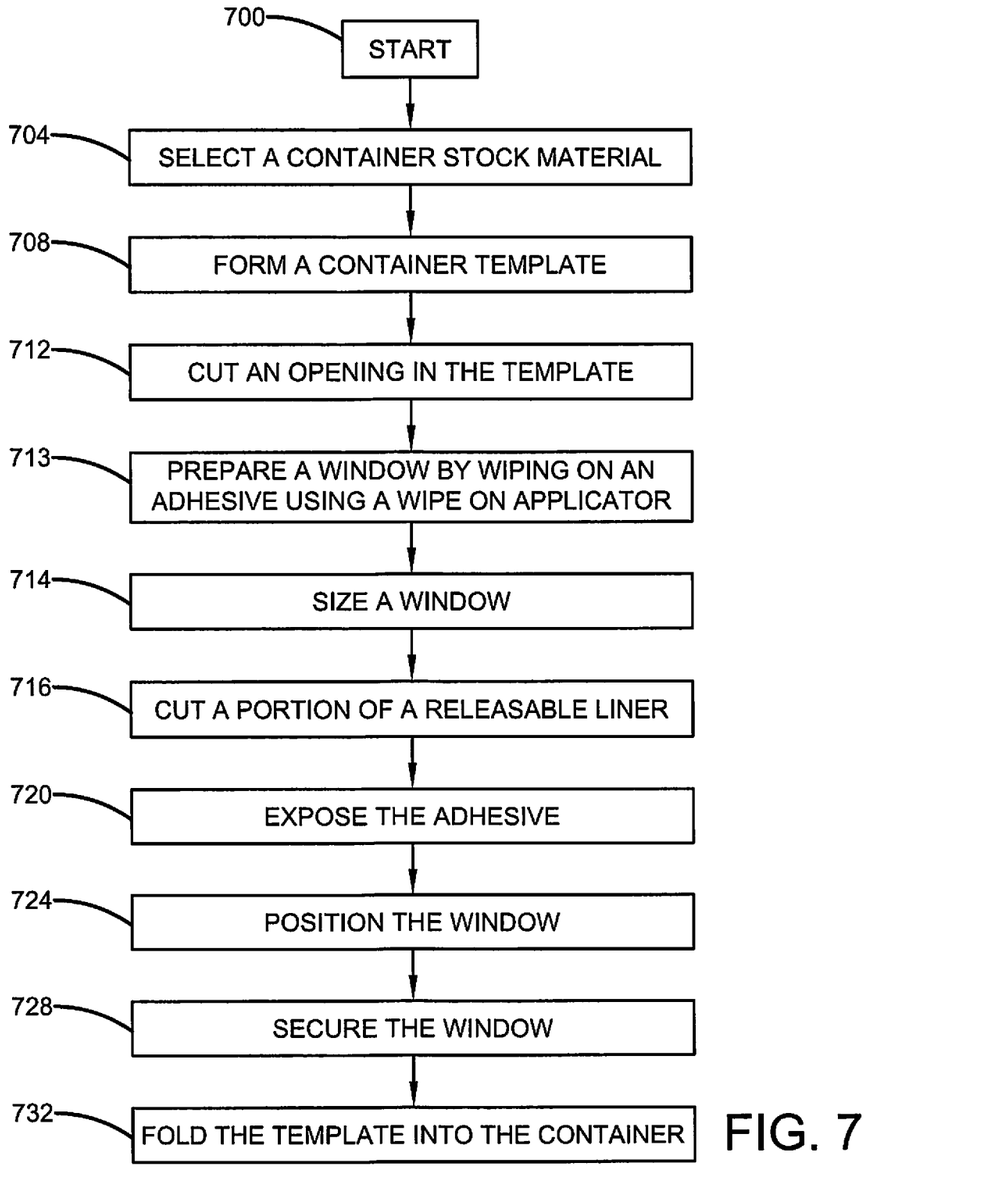
FIG. 7 illustrates a block diagram of a process for manufacturing a container with a window in accordance with the disclosed architecture.

As illustrated in FIG. 7, a process for fabricating a container 100 with a non-heat-seal window 124 is disclosed at 700. The process begins at 704 by selecting a container stock material 102, such as, but not limited to, a cardboard stock comprising an inside surface 106 and an outside surface 108. The container stock material is then cut or formed at 708 into a container template 104 for forming the container 100. The process continues at 712 by cutting an opening 120 in the container template 104. The container template 104 comprises a plurality of panels 112 comprising walls 114, base panels 116, and top panels 118. While the opening 120 is typically located within at least one of the walls 114, this is not meant as a limitation as opening 120 may be located within any one or more of the plurality of panels 112 to suit user preference.

At 714, the window 124 is sized and cut from a window stock material 126 so as to be larger than and to overlap the opening 120 in the container template 104. The window 124 comprises the window stock material 126 comprising an interior surface 130, an exterior surface 128, and an opening overlap portion 134. The window 124 further comprises an adhesive 134 covering the exterior surface 128 of the window stock material 126, and a releasable liner 138 covering the adhesive 134. The adhesive 134 is pre-applied to the window 124 using a wipe on label applicator at 713. At 716, a cutter, such as a die cutter, is used to cut the releasable liner 138 at a dimension slightly larger in size than that of the opening 120. A cut portion 140 of the releasable liner 138 is then peeled off of the window stock material 126 to expose the adhesive 134 at 720. The adhesive 134 may be a two sided pressure sensitive adhesive capable of adhering to both the window stock material 126 and the inside surface 106 of the container stock material 102. Next, at 724, the window 124 is positioned over the opening 120 so that the adhesive 134 is adjacent to an overlap perimeter 122 of the inside surface 106 of the container template 104 immediately surrounding the opening 120.

The opening overlap portion 134 of the window stock material 126 engages the adhesive 134 so that the adhesive 134 is now sandwiched or positioned between the exterior surface 128 of the opening overlap portion 132 of the window stock material 126 and the inside surface 106 of the container stock material 104, thereby securing the window 124 to the inside surface 106 of the container stock material 104 at 728. The window stock material 126 may be supplied by a roller with cutting elements, as illustrated in FIG. 6. For example, a clear PET label with a food grade PSA may be manufactured using rotary die cutting on a conventional flexo label press. Once the window 124 is adhered, bonded or otherwise sealed to the container template 104, the container template 104 is folded or otherwise formed into container 100 having a window for viewing the contents of the contained once the container 100 is sealed at 732. The aforementioned process allows conventional high speed labeling equipment to apply a clear label acting as a windowpane vs. conventional patch windowing equipment to apply a clear cellophane window. Similarly, the process permits window application, container forming, and container sealing to be accomplished in one operation vs. multiple operations, thereby reducing overall manufacturing time and cost and improving efficiency.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A process for fabricating a container with a non-heat-seal window comprising the steps of:
    forming a container template out of a low surface energy container stock material, wherein an inside surface of the container template has a surface energy that is not greater than 40 dynes and comprises a plurality of fill level lines indicating a remaining volume within the container;
    cutting an opening in the container template;
    sizing the window to overlap the opening, the window comprising a window stock material, a releasable liner, and a two sided adhesive pre-applied to an entire exterior surface of the window stock material via a wipe on applicator, wherein the two sided adhesive is sandwiched between the entire exterior surface of the window stock material and the releasable liner;
    cutting a portion of the releasable liner to fit the opening;
    exposing a portion of the two sided adhesive previously covered by the cut portion of the releasable liner, and wherein the remaining adhesive remains sandwiched between the exterior surface of the window stock material and the releasable liner sized to cover the opening;
    securing the window to an inside surface of the container template to cover the opening where the two sided adhesive completely wets out the entire inside surface of the container in contact with the window during adhesion; and
    folding the container template into the container.

2. The process of claim 1, wherein the adhesive is only exposed on the window where the window overlaps the opening.

3. The process of claim 1, wherein the adhesive is a food grade pressure sensitive adhesive.

4. The process of claim 1, wherein the window stock material is manufactured from polyethylene terephthalate, a thermoplastic polymer, or a polyester material.

5. The process of claim 1, wherein the adhesive is a pressure sensitive adhesive.

6. The process of claim 1, wherein the adhesive bonds to the window stock material and the low surface energy container stock material without applying heat.

7. The process of claim 1, wherein an exterior surface of the window stock material is adjacent to the inside surface of the container template.

8. The process of claim 1, wherein the container stock material is a low-density polyethylene paperboard.

9. A process for fabricating a container with a non-heat-seal window comprising the steps of:
    forming a container template out of a low density polyethylene paperboard, wherein an inside surface of the container template has a surface energy that is not greater than 40 dynes;
    cutting an opening in the container template;
    providing a window stock material with a food grade pressure sensitive adhesive pre-applied to an exterior surface of the window stock material via a wipe on technique using a wipe on applicator;
    applying a releasable liner to the window stock material sandwiching the food grade pressure sensitive adhesive between the window stock material and the releasable liner;
    cutting the window out of the window stock material to overlap the opening;
    cutting a portion of the releasable liner to fit the opening;
    exposing a portion of the food grade pressure sensitive adhesive previously covered by the cut portion of the releasable liner;
    securing the window to an inside surface of the container template to cover the opening using the wiped on food grade pressure sensitive adhesive where the food grade pressure sensitive adhesive wets out the entire inside surface of the container contacted by the food grade pressure sensitive adhesive during adhesion without squeezing out into the opening; and
    folding the container template into the container.

10. The process of claim 9, wherein the food grade adhesive bonds to the window stock material and the low density polyethylene paperboard without applying heat or extending beyond the window.

* * * * *